United States Patent

[11] 3,623,690

| [72] | Inventor | Dale L. Bargman, Jr. Broomfield, Colo. |
|---|---|---|
| [21] | Appl. No. | 887,900 |
| [22] | Filed | Dec. 24, 1969 |
| [45] | Patented | Nov. 30, 1971 |
| [73] | Assignee | Colorado Leisure Products, Inc. Broomfield, Colo. |

[54] RELEASABLE HOLDDOWN DEVICE
15 Claims, 8 Drawing Figs.

[52] U.S. Cl. ................................................ 248/361, 296/23 MC, 296/35 A
[51] Int. Cl. ................................................ B60p 7/08
[50] Field of Search ................................................ 248/361, 159; 296/23 MC, 35 A; 85/79, 66, 67; 211/182; 287/126, 124

[56] References Cited
UNITED STATES PATENTS

| 1,325,353 | 12/1919 | Day | 248/361 X |
| 1,349,437 | 8/1920 | Royer | 85/79 X |
| 2,057,404 | 10/1936 | Wahlstrom | 287/124 X |
| 2,059,445 | 11/1936 | Eastman | 211/182 X |
| 2,377,077 | 5/1945 | Gay | 85/79 |
| 3,356,408 | 12/1967 | Stutz | 296/23 |
| 3,421,726 | 1/1969 | Getter | 248/361 |
| 3,455,573 | 7/1969 | Magers | 280/179 |
| 2,051,251 | 7/1936 | Epstein | 85/79 X |

Primary Examiner—Chancellor E. Harris
Attorney—Reilly and Lewis

ABSTRACT: A releasable holddown device specifically suited for a variety of vehicle-transported loads has an anchoring unit releasably insertable into a hole such as the stake pocket of a vehicle bed including an attaching member adapted to connect to the load. The anchoring unit includes movable wedge members normally retained in a retracted position and expandable laterally away from one another into anchored engagement against the supporting wall of the hole by selectively controlling the movement of an actuating member therebetween and in such a way as to affect full surface engagement between wedge members and the supporting walls.

PATENTED NOV 30 1971 3,623,690

INVENTOR.
DALE L. BARGMAN, JR.
BY
ATTORNEYS

PATENTED NOV 30 1971

RELEASABLE HOLDDOWN DEVICE

SPECIFICATION

This invention relates to holddown or anchor devices adapted for insertion into the openings in stake pockets on a vehicle bed and the like to facilitate releasable anchoring of a variety of loads to the vehicle bed.

There are a variety of load applications wherein it is desirable to positively and firmly secure a load on a vehicle bed or other fixture. This is particularly true of relatively large and/or bulky loads such as camper bodies, stockracks, grain boxes, pipes, etc. which are frequently transported on or from the side of a pickup-type vehicle bed. Although a variety of means heretofore have been used to secure loads on a vehicle bed, none have proven entirely satisfactory for all applications from the standpoint of a reliable anchor which is versatile, and easy to remove when not in use. Accordingly, it is an object of this invention to provide a simple, durable, and reliable holddown device for a variety of vehicle loads which utilizes the stake pockets to anchor the load to the bed and which may be readily removed from the bed when not in use.

Another object of this invention is to provide a holddown device which will insert into a stake pockets of a vehicle bed and provide a substantial degree of surface contact with the walls surfaces of the stake pocket to secure the load being carried by the vehicle bed firmly in place.

Yet a further object of this invention is to provide a holddown device which is readily adaptable for use on a variety of vehicle beds and will hold a variety of vehicle loads.

In accordance with the present invention there is provided a holddown device or assembly comprised of an expandable anchoring unit insertable into the top opening of a stake pocket on a vehicle bed together with an attaching member associated with the anchoring unit for fastening of the load thereto. The anchoring unit is comprised of a pair of opposed channel-shaped wedge members with an actuating nut therebetween threaded on a bolt to selectively move the wedge members away from one another and into full surface engagement against opposed walls of the pocket. A resilient sleeve member retains the wedge members in a retracted position and the sleeve member frictionally engages the inner wall surface of the stake pocket.

Other objects, advantages and capabilities of the present invention will become more apparent as the description proceeds taken in conjunction with the accompanying drawings in which.

Figure 1:
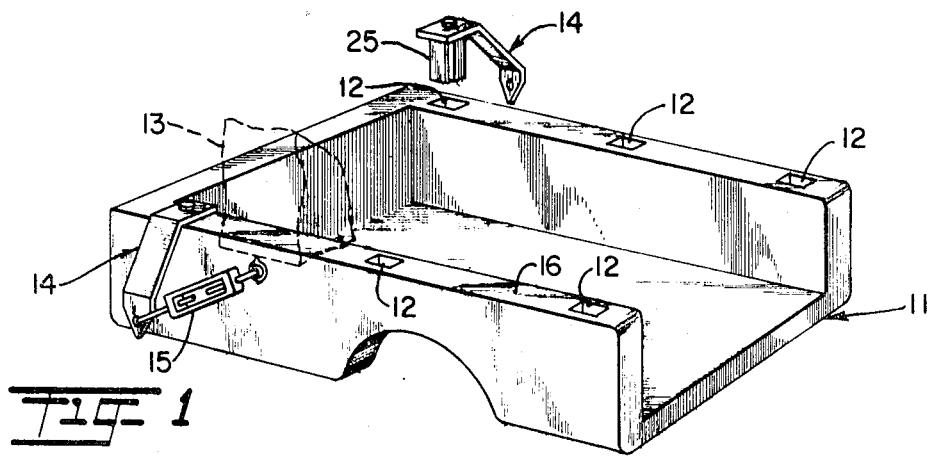
FIG. 1 is a perspective view of a pickup truck-type vehicle bed with one form of holddown device specifically suited for a full-size camper body with one device shown in an anchored position in a stake pocket and secured to the camper body by a turnbuckle and another similar holddown device on the other side of the bed is shown as removed from another stake pocket.
Figure 2:
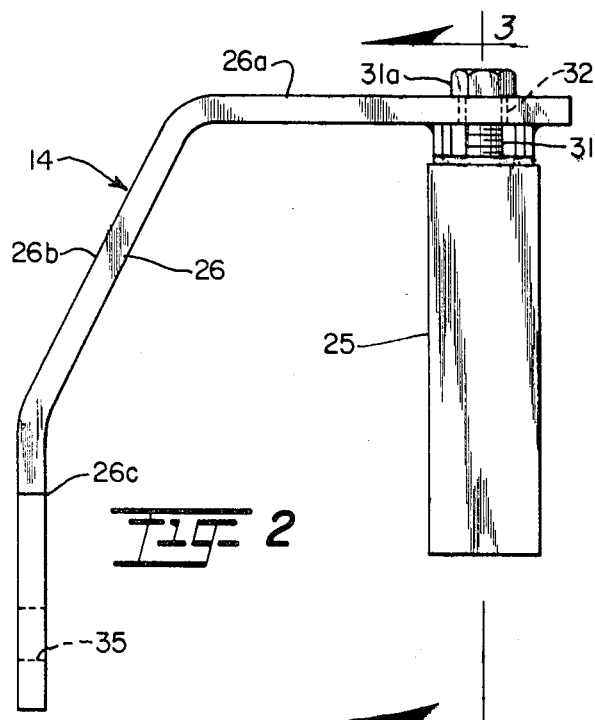
FIG. 2 is a side elevation view of the releasable holddown device for a camper shown in FIG. 1.

Referring now to the drawings, a typical structure on which holddown bracket devices of the present invention may be mounted comprises a vehicle bed 11 having several stake pockets 12 in each sidewall of the bed. A portion of a full-size camper 13 is shown as being supported on the vehicle bed. One holddown device 14 specifically suited for full-size campers is shown in FIG. 1 in an anchored position in a stake pocket 12 and another holddown device 14 is shown in an elevated removed position on the other side of the vehicle bed. A turnbuckle 15 connects at one end to the holddown device 14 and extends rearwardly to connect to a hook in a side wing of the camper 13 overhanging the vehicle bed 11.

Figure 3:
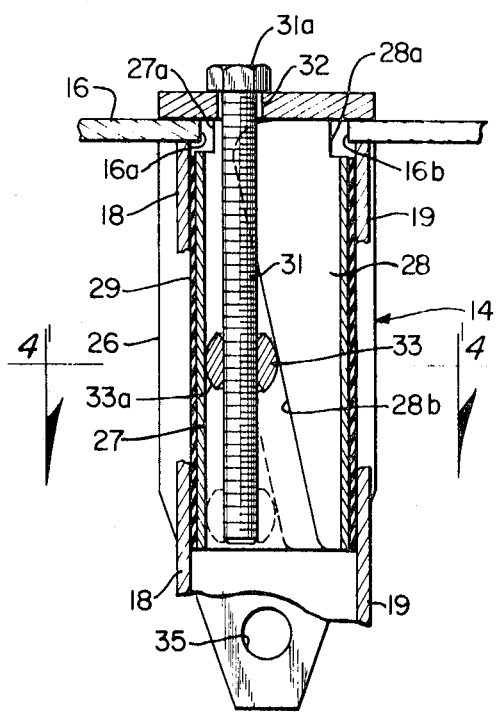
FIG. 3 is a vertical sectional view taken along lines 3—3 of the anchoring unit of FIG. 2 in an anchored position with a fragment of the truck bed pocket walls being shown.

Each stake pocket 12 of a vehicle bed as shown in FIG. 3 is typically defined by a top wall 16 in which a stake opening is formed and usually the pocket will have at least a forward wall 18 and a rear wall 19 and sometimes may have sidewalls 21 and 22 so as to provide a full enclosure which is open at the bottom. The walls are shown inset from the pocket opening to form overhanging edges 16a and 16b.

The holddown device 14 comprises an anchoring unit 25 sized for easy insertion into and removal from the stake pocket 12 through its top opening together with an attaching member 26 projecting outwardly and downwardly from the top of the anchoring unit and disposed in spaced proximity along a side thereof.

The anchoring unit 25 comprises an uprightly disposed, generally U- or channel-shaped outer wedge member 27 together with a generally U- or channel-shaped inner wedge member 28 slidably fitted within the outer wedge member and oppositely directed therein.

Figure 4:
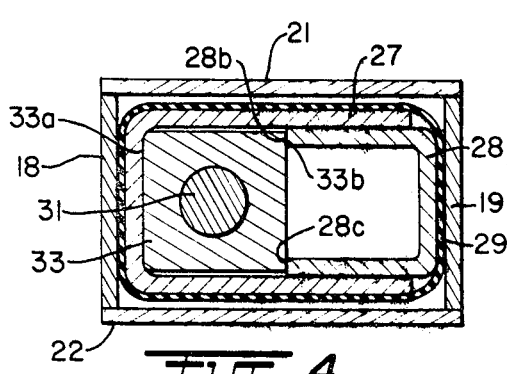
FIG. 4 is a horizontal sectional view taken along lines 4—4 of FIG. 3 with walls of the bed pocket shown encompassing the anchoring unit.

The channel-shaped wedge members shown are specifically adapted for insertion into the stake pockets which have spaced parallel front and rear walls as shown in FIGS. 3 and 4. The closed end walls of the wedge members are flat so as to fully conform to or correspond with the shape of the pocket walls. Thus, the opposed end walls of the wedge members are advanced in planes parallel to those of the pocket walls and establish full surface engagement between the oppositely disposed flat end walls of the wedge members and the flat stake pocket walls. This effects a relatively broad frictional contact area and full surface engagement between the anchoring unit and the pocket walls for the most positive, reliable holding action.

The sides or legs of the outer wedge member 27 are generally parallel to the sides or legs of the inner wedge member, and the inner surfaces of the outer wedge member are closely aligned with those of the inner wedge member to define guide surfaces therebetween. The inner free ends along the sides of the wedge member 28 are tapered along their length, being narrower at the bottom and wider at the top to provide tapered inner end surfaces 28b and 28c. The outer wedge member 27 has an upper notched end 27a cut into the upper end along its forward end wall to receive ledge 16a of the vehicle bed, and wedge member 28 has an upper notch 28a in its rear end wall to receive ledge 16b of the bed. These notches permit the flat end walls of the wedge members to move a sufficient distance within the pocket to become firmly wedged against the pocket walls.

A resilient sleeve member or hollow body 29 encompasses the wedge members to normally retain the inner wedge member within the outer wedge member in a retracted position, and the resilient sleeve in turn frictionally engages the forward and rear inner wall surfaces of the stake pocket in the expanded position. In the alternative, a coil spring or the like may be wrapped around the outside of the outer wedge member, or a relief spring in the wedge members may be used to normally retain the wedge members in a retracted position.

An actuating screw-threaded bolt 31 extends through an aperture 32 in the top of the arm and between the wedge members and extends substantially throughout the lengthwise extent of the wedge members. An actuating nut 33, rectangular in horizontal cross section, as shown in FIG. 4, is threaded on the lower end of the bolt. The nut 33 is normally in its lowermost or deepest position withing the housing when the wedge member is in the retracted position as represented in dashed lines in FIG. 3. The nut is an essentially cylindrical body disposed on its side with the threaded aperture extending therethrough arranged laterally of its longitudinal axis and in this way one semicircular surface 33a of the nut engages the inner end surfaces of the outer wedge member and the opposite semicircular surface 33b engages the tapered surfaces 28b and 28c so that upon rotation of the bolt in a direction to move the nut upwardly and out of the pocket the wedge members are expanded away from one another overcoming the bias of the resilient sleeve member 29, and the opposed end walls of the wedge members are forced into full surface engagement with the front and rear walls 18 and 19 of the pocket to wedge the anchoring unit firmly in the pocket. For the removal of the holddown device from the pocket, the bolt is rotated in the opposite direction so that the nut will move downwardly along the bolt and the resilient sleeve 19 will return the inner wedge member into its retracted position relative to the outer wedge member.

The attaching member 28 is in the form of a bracketlike arm which is secured at one end across the top or upper end of the outer wedge member as by welding. The arm has an upper straight horizontal section 26a, an angularly inclined section 26b and a vertical terminal section 26c which is shown to extend below the anchoring unit 25, so that the contour of the arm will generally conform to the contour of the side of the vehicle bed 11. An aperture 35 is provided adjacent the lower end of the arm to facilitate its attachment to the turnbuckle 15, as shown in FIG. 1. As best shown in FIG. 3 the horizontal section 26a seats on the top wall of the vehicle bed and extends across the pocket opening of the vehicle bed.

Figure 5:
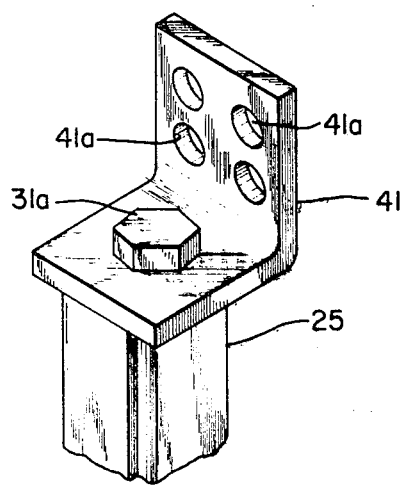
FIG. 5 is a perspective view of another holddown device having another attaching member in the form of a right-angle bracket.

Referring now to FIG. 5 a more universal-type holddown device is shown to include the same anchoring unit 25 as above described having a right-angle-shaped attaching bracket arm 41 mounted across the top thereof and fixedly secured thereto with apertures 41a in the upstanding leg through which bolts or like fasteners may extend to fasten the load thereto. The bolthead 31a seats on the lower leg of the bracket arm and the threaded portion thereof extends into the anchoring unit 25.

Figure 6:
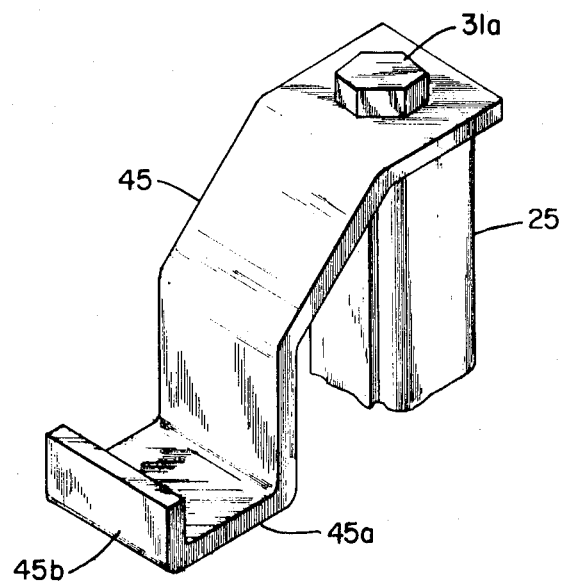
FIG. 6 is a perspective view of yet another form of holddown device having another attaching member in the form of an outwardly extending and upturned bracket for side-carry applications.

Another form of holddown device for side-carry applications such as pipes is shown in FIG. 6 to include the anchoring unit 25 including a bracket arm 45 having a portion similar to the shape of attaching member 26 above described and further including at the outer a horizontal section 45a and an upturned end section 45b to form an essentially cradlelike side support on the anchoring unit.

Figure 7:
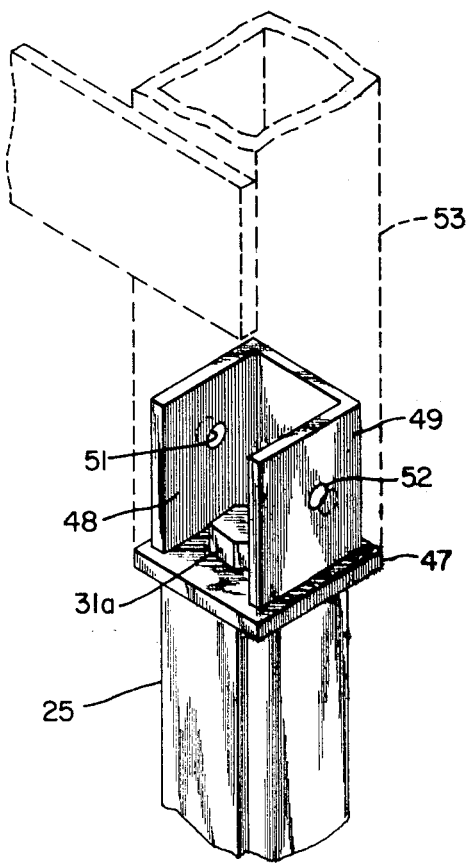
FIG. 7 is a perspective view of yet another holddown device having a U-shaped attaching member over which the hollow leg of a stock rack will slide to releasably hold a stock rack on the bed.

The holddown device in FIG. 7 has yet another form of attaching member for stockrack applications including a flat plate 47 secured to the top of the anchoring unit 25 together with spaced upstanding legs or sides 48 and 49 which are secured to the plate. Aligned boltholes 51 and 52 are provided in upstanding sides 48 and 49. The procedure is to anchor the holddown device in the pocket and then slide the tubular or hollow stockrack leg 53 over the upstanding legs 48 and 49 and bolt the stockrack leg thereto using holes 51 and 52.

Figure 8:
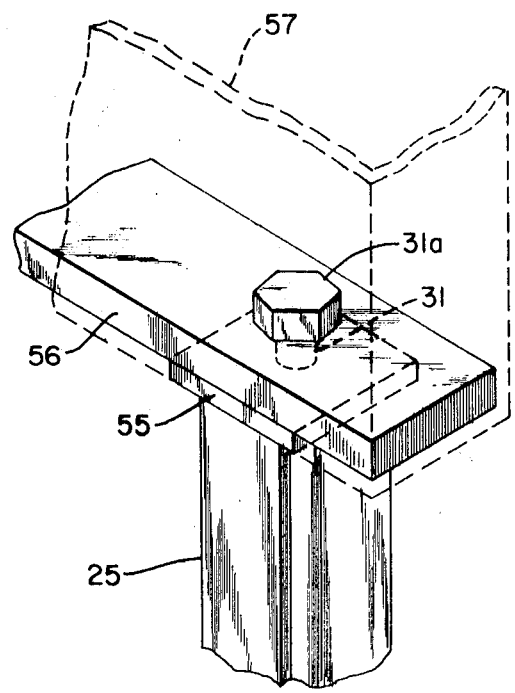
FIG. 8 is a perspective view of yet another holddown device having a flat plate for an attaching member on which a longitudinal base support of a camper shell may be attached.

The holddown device shown in FIG. 8 has a single plate 55 extending across the top of the anchoring unit 25 through which the bolt extends. A fragment of a base member 56 of a camper shell seats on the plate and the bolt extends through the base member 56 and plate 55 to anchor the camper shell 56 to the truck bed.

While the present invention has been described with reference to particular structure and preferred components, there is no intent to limit the spirit of the present invention to this structure except as defined by the appended claims.

What is claimed is:

1. A releasable holddown device comprising an anchoring unit releasably insertable into a hole, said unit including a pair of movable wedge members having relatively broad opposed end walls, means to normally retain the wedge members in a retracted position, actuating means between the wedge members to selectively control the movement of the end walls laterally away from one another and against the wall of the hole whereby to effect full surface engagement between the end walls of said wedge members and the wall of the hole, said movable wedge members being channel-shaped and oppositely directed so that one slidably fits in the other.

2. A releasable holddown device as set forth in claim 1 wherein said retaining means for the wedge members is a flexible sleeve encompassing said movable wedge members and frictionally engaging wall surfaces of the pocket.

3. A releasable holddown device for securing a load to a vehicle bed comprising an anchoring unit releasably insertable into an opening in a pocket of the vehicle bed including opposed cooperative outer and inner movable wedge members, said outer wedge member having surfaces to guide the movement of the inner wedge member therein, means to retain the wedge members together while allowing the inner wedge member to move within the outer wedge member, actuating means between wedge members to selectively control the lateral movement of the wedge members against opposed walls of the pocket to releasably anchor the unit in the pocket and an attaching member mounted on the anchoring unit externally of the pocket adapted to releasably connect to the load.

4. A releasable holddown device as set forth in claim 3 wherein said attaching member extends across the top of the anchoring unit to seat on a top wall of the vehicle bed and extend across the pocket opening.

5. A releasable holddown device as set forth in claim 3 wherein said actuating means includes a bolt extending through the attaching member and between the wedge members, said bolt having a head disposed on the top of the attaching member.

6. A releasable holddown device as set forth in claim 5 wherein said actuating means includes a generally cylindrical nut threaded on the bolt laterally of its longitudinal axis with its curved external surfaces adapted to engage opposed inner surfaces of the wedge members.

7. A releasable holddown device as set forth in claim 3 wherein said attaching member is in the form of a bracketlike arm which extends outwardly and downwardly from a side of the base and is adapted to attach to a portion of the camper body overhanging the truck bed.

8. A releasable holddown device as set forth in claim 3 wherein said attaching member is in the form of a right-angle bracket including an upstanding leg having apertures in the upstanding leg thereof.

9. A releasable holddown device as set forth in claim 3 wherein said attaching member is in the form of a U-shaped bracket adapted to slidably insert into a hollow leg of a stockrack and the like.

10. A releasable holddown device as set forth in claim 3 wherein said attaching member is in the form of a cradle like support bracket which extends outwardly, downwardly and the upwardly from the expandable base.

11. A releasable holddown device as set forth in claim 3 A said attaching member is in the form of a flat, platelike bracket.

12. A releasable holddown device comprising an anchoring unit releasably insertable into a hole, said anchoring unit including a pair of laterally opposed, inner and outer channel-shaped wedge members, each provided with an end wall and opposite sides in overlapping relation to the opposite sides of at least one of said wedge members having forwardly tapered free end surfaces and movable through an open side of the other wedge member to anchor the anchoring unit in the hole, resilient means to normally retain said wedge members in a retracted position, an actuating screw-threaded bolt extending between said wedge members having a nut threaded thereon, said nut being engageable with the tapered end surfaces of the one wedge member and the end surfaces on opposite sides of the other wedge member to advance the wedge members laterally away from the bolt as the bolt is rotated in a direction to advance the nut rearwardly out of the hole whereby to effect full surface engagement between the end walls of said wedge members and the wall of the hole.

13. A releasable holddown device for securing a load to a vehicle bed comprising an anchoring unit releasably insertable into the opening of a stake pocket in the bed of a vehicle, said anchoring unit including an outer channel-shaped wedge member, an inner oppositely directed channel-shaped tapered wedge member narrower at the bottom and wider at the top slidably fitted in the outer wedge member and movable through an open side of the outer wedge member to anchor the base in the pocket, a resilient sleeve encompassing the wedge members to normally retain the wedge members in a retracted position and frictionally engage the inner wall surfaces of the pocket, an actuating screw-threaded bolt extending between the wedge members having a cylindrical shaped nut threaded thereon, said nut being in engagement with a tapered surface of the inner wedge member and an inner sidewall of the outer wedge member to advance the wedge members laterally as the bolt is rotated in a direction to advance the nut out of the pocket, and an attaching member extending across the top of the base adapted to seat on the bed and extend across the pocket opening and arranged to releasably connect to the load.

14. A releasable holddown device as set forth in claim 13 wherein said wedge members include oppositely disposed notches along their upper ends to clear overhanging ledges at the pocket opening.

15. A releasable holddown device comprising an anchoring unit releasably insertable into a hole, said unit including cooperative outer and inner wedge members having opposed end walls, said outer wedge member having spaced sidewalls arranged to slidably receive and guide the movement of the inner wedge member within the outer wedge member, and actuating means between said wedge members to selectively control the movement of the end walls of said wedge members toward and away from one another and against the wall of the hole whereby to effect a substantial surface engagement between the end walls of said wedge member and the wall of the hole.

* * * * *